US 8,857,854 B2

(12) United States Patent
Midorikawa

(10) Patent No.: US 8,857,854 B2
(45) Date of Patent: Oct. 14, 2014

(54) PASSENGER RESTRAINT DEVICE FOR VEHICLES

(75) Inventor: Yukinori Midorikawa, Yokohama (JP)

(73) Assignee: Autoliv Development AB, Vårgårda (SE)

( * ) Notice: Subject to any disclaimer, the term of this patent is extended or adjusted under 35 U.S.C. 154(b) by 325 days.

(21) Appl. No.: 13/500,351

(22) PCT Filed: Oct. 1, 2010

(86) PCT No.: PCT/JP2010/067283
§ 371 (c)(1),
(2), (4) Date: Apr. 5, 2012

(87) PCT Pub. No.: WO2011/043273
PCT Pub. Date: Apr. 14, 2011

(65) Prior Publication Data
US 2012/0198953 A1 Aug. 9, 2012

(30) Foreign Application Priority Data
Oct. 6, 2009 (JP) .................................. 2009-232398

(51) Int. Cl.
*B60R 22/36* (2006.01)
(52) U.S. Cl.
USPC ....................................................... 280/806
(58) Field of Classification Search
CPC ........ B60R 22/34; B60R 22/44; B60R 22/46; B60R 22/1952; B60R 22/1955; B60R 22/4619; B60R 2022/468; B60R 2022/4666; B60R 2022/4685
USPC .......... 280/806, 807; 297/475, 476, 477, 478; 242/390.8, 390.9
See application file for complete search history.

(56) References Cited

U.S. PATENT DOCUMENTS

| | | | | |
|---|---|---|---|---|
| 7,216,827 B2 * | 5/2007 | Tanaka et al. | ............... | 242/390.8 |
| 7,240,923 B2 * | 7/2007 | Tanaka et al. | ................ | 280/807 |
| 7,278,600 B2 * | 10/2007 | Inuzuka et al. | ............... | 242/374 |
| 7,380,740 B2 * | 6/2008 | Tanaka et al. | ................ | 242/374 |
| 7,506,832 B2 * | 3/2009 | Mori | ............................. | 242/374 |

(Continued)

FOREIGN PATENT DOCUMENTS

| | | |
|---|---|---|
| JP | 2005-029014 | 2/2005 |
| JP | 2006-103453 | 4/2006 |
| WO | WO 2006/123750 | 11/2006 |

OTHER PUBLICATIONS

International Search Report of PCT/JP2010/067283 Mailed on Oct. 26, 2010, 2 pages.

*Primary Examiner* — Faye M. Fleming
(74) *Attorney, Agent, or Firm* — Brinks Gilson & Lione

(57) ABSTRACT

A vehicle occupant restraint system that includes a clutch mechanism, an electric actuator, a spindle and a power transmission mechanism that transmits motive power from the actuator to the clutch mechanism. The transmission mechanism has a low reduction transmission path that reduces rotation of the actuator at a low reduction ratio, a high reduction transmission path that reduces rotation of the electric actuator at a high reduction ratio, and switching means. When a possible collision is detected, the actuator is positively rotated and rotation is transmitted to the clutch mechanism at a high speed and low torque via the low reduction transmission path, until coupling of the clutch mechanism is complete. Subsequently, the transmission mechanism is switched to the high reduction transmission path and rotation is transmitted to the clutch mechanism, at a low speed and high torque, to wind the seatbelt around the spindle.

5 Claims, 12 Drawing Sheets

(56) References Cited

U.S. PATENT DOCUMENTS

2005/0098672 A1* 5/2005 Tanaka et al. .............. 242/390.8
2006/0175453 A1* 8/2006 Takao et al. ................. 242/374
2006/0220368 A1* 10/2006 Takao et al. ................ 280/801.1
2006/0261589 A1* 11/2006 Tanaka ........................ 280/806
2007/0085319 A1* 4/2007 Scherzinger et al. ......... 280/806

* cited by examiner

PASSENGER RESTRAINT DEVICE FOR VEHICLES

BACKGROUND OF THE INVENTION

1. Field of the Invention

The present invention relates to a vehicle occupant restraint system, and in particular, to a vehicle occupant restraint system provided with an electric actuator.

2. Description of Related Technology

Conventionally, when it is determined that there is a possibility of vehicle collision, the motor (electric actuator) is positively rotated to enable transmission of the motor drive system, the seatbelt is wound around a spindle to lightly restrain the occupant, and, when it is subsequently determined that there is no longer a possibility of collision, the motor is reversely rotated to disable the transmission of the motor drive system and return it to its original state. This is a three-point seatbelt retractor which increases the restraint with a pretensioner upon a collision, and thereby reliably protects the occupant.

As this kind of seatbelt retractor, known is a seatbelt device which transmits the motive power of the motor to the spindle via the gear train with a torque limiter mechanism built therein and the clutch mechanism, and thereby winds the seatbelt (for instance, refer to Patent Document 1 identified below). In addition, with this clutch mechanism, the connection/disconnection between the motor and the spindle can be reversibly switched when the pretensioner is not actuated, and the motor and the spindle are irreversibly disconnected when the pretensioner is actuated.

Moreover, also known is a seatbelt retractor, wherein the power transmission mechanism which transmits motive power from the motor to the spindle comprises a low reduction ratio reduction mechanism configured from a gear train, and a high reduction ratio reduction mechanism configured from a planetary gear, and the seatbelt retractor is actuated in a low reduction ratio power transmission mode by the low reduction ratio reduction mechanism when the tensile force of the seatbelt is a predetermined value or less, and in a high reduction ratio power transmission mode by the high reduction ratio reduction mechanism when the tensile force of the seatbelt is greater than a predetermined value so as to simultaneously achieve the swift winding of the seatbelt, and the winding of the seatbelt at a high torque, whereby a pretensioner using reactant gas is no longer required (for instance, refer to Patent Documents 2 and 3 identified below).

Patent Document 1: Japanese Translation of PCT Application No. 2006-123750

Patent Document 2: Japanese Patent Application Publication No. 2005-29014

Patent Document 3: Japanese Patent Application Publication No. 2006-103453

Meanwhile, when a power transmission mechanism that configures the motor drive system of Patent Document 1 includes a clutch mechanism, the actual winding of the seatbelt does not start until the motor is rotated a predetermined angle or more from when the actuation of the motor is started due to the time that is required for the clutch mechanism to become a connected state or the gaps between the respective components, and there is a problem in that much time is required from when the actuation of the motor is started to when the actual winding of the seatbelt is started. Thus, there are demands for swifter and more reliable actuation of a seatbelt retractor.

SUMMARY OF THE INVENTION

The present invention was devised in view of the foregoing, and its object is to provide a vehicle occupant restraint system capable of swiftly protecting the occupant by shortening the time from when the actuation of the motor is started to when the actual winding of the seatbelt around the spindle is started.

The foregoing object of the present invention can be achieved based on the following configuration.

A vehicle occupant restraint system comprising a spindle that winds a seatbelt, an electric actuator that generates motive power for rotating the spindle, a clutch mechanism that connects or disconnects the electric actuator and the spindle, a power transmission mechanism that is configured to transmit motive power from the electric actuator to the clutch mechanism, and collision possibility detector that is configured to detect information and determine a possibility of collision, wherein the power transmission mechanism comprises: a first reduction transmission path that reduces the rotation of the electric actuator at a first reduction ratio and transmits the rotation to the clutch mechanism; a second reduction transmission path that reduces the rotation of the electric actuator at a reduction ratio that is higher than the first reduction ratio and transmits the rotation to the clutch mechanism; and a switching mechanism configured to switch the connection with the clutch mechanism between the first reduction transmission path and the second reduction transmission path, when a possibility of collision is detected by the collision possibility detector, the electric actuator is positively rotated, and the rotation of the electric actuator is transmitted to the clutch mechanism at a high speed and low torque via the first reduction transmission path at least until the coupling of the clutch mechanism is complete, and the power transmission mechanism is configured to be switched from the first reduction transmission path to the second reduction transmission path after the coupling of the clutch mechanism is complete, and the rotation of the electric actuator is transmitted to the clutch mechanism at a low speed and high torque.

In another aspect of the invention, when there is no longer the possibility of collision after the electric actuator is actuated, the electric actuator is configured to be reversely rotated, and the rotation of the electric actuator is transmitted to the clutch mechanism at a high speed and low torque via the first reduction transmission path.

In another aspect of the invention, the vehicle occupant restraint system further comprises: collision detector configured to detect the collision of a vehicle, wherein, when the collision is detected by the collision detector after the electric actuator is actuated, the electric actuator is configured to be reversely rotated, and the rotation of the electric actuator is transmitted to the clutch mechanism at a high speed and low torque via the first reduction transmission path.

In a further aspect of the invention, the first reduction transmission path is provided with an electric actuator-side gear, a clutch mechanism-side gear, and a first reduction gear including a pinion configured to mesh with the electric actuator-side gear, and a wheel configured to be meshed with the clutch mechanism-side gear, the second reduction transmission path is provided with the electric actuator-side gear, the clutch mechanism-side gear, and a second reduction gear including another pinion configured to mesh with the electric actuator-side gear, and another wheel configured to mesh with the clutch mechanism-side gear, and the switching mechanism being configured to switch a position of the first reduction gear and a position of the second reduction gear so that the pinion and the wheel of the first reduction gear or the other pinion and the other wheel of the second reduction gear respectively mesh with the electric actuator-side gear and the clutch mechanism-side gear.

In another aspect of the invention, the first reduction transmission path is provided with an electric actuator-side gear, a high speed fixed gear that is supported by a first shaft and configured to mesh with the electric actuator-side gear, a high speed moving gear that is supported by a second shaft that is movable in an axial direction and that is configured to mesh with the high speed fixed gear, and a clutch mechanism-side gear that is supported by the second shaft, the second reduction transmission path is provided with the electric actuator-side gear, a low speed fixed gear that is supported by the first shaft, a low speed moving gear that is provided to the second shaft and configured to mesh with the low speed fixed gear, and the clutch mechanism-side gear, and the switching mechanism is configured to move the second shaft in the axial direction so that the high speed fixed gear meshes with the high speed moving gear, or the low speed fixed gear meshes with the low speed moving gear.

According to the vehicle occupant restraint system of the present invention, during emergencies of the vehicle, the clutch mechanism can be actuated in a short period of time, the time from when the actuation of the electric actuator is started to when the actual winding of the seatbelt around the spindle is started can be shortened, movement of the occupant can be inhibited, and the restraint performance can be improved. Moreover, after the coupling of the clutch mechanism is complete, the force of winding the seatbelt by the electric actuator will increase, and the occupant can be reliably protected. It is therefore possible to prepare for the impact from the collision quicker than conventional systems. Consequently, the occupant is restrained at an appropriate position for an air-bag, and the safety performance is improved.

Moreover, when there is no longer the possibility of collision after the electric actuator is actuated, the electric actuator can promptly release the restraint of the seatbelt and eliminate the uncomfortable feeling of the occupant when no restraint is required.

Moreover, when a collision occurs, it is possible to quickly disengage the clutch and disconnect the connection of the power transmission mechanism and the spindle. Thus, it is possible to quickly prevent the influence that the power transmission mechanism will have on the occupant protection mechanism such as the pretensioner and the energy absorption mechanism. Consequently, the performance of restraining the occupant will improve, and the safety of the seatbelt will improve further.

In addition, the first reduction transmission path, the second reduction transmission path, and the switching means can be configured with a relatively simple structure.

Further objects, features and advantages of this invention will become readily apparent to persons skilled in the art after a review of the following description, with reference to the drawings and claims that are appended to and form a part of this specification.

DETAILED DESCRIPTION

Embodiments of the vehicle occupant restraint system according to the present invention are now explained in detail with reference to the drawings.

Figure 1:
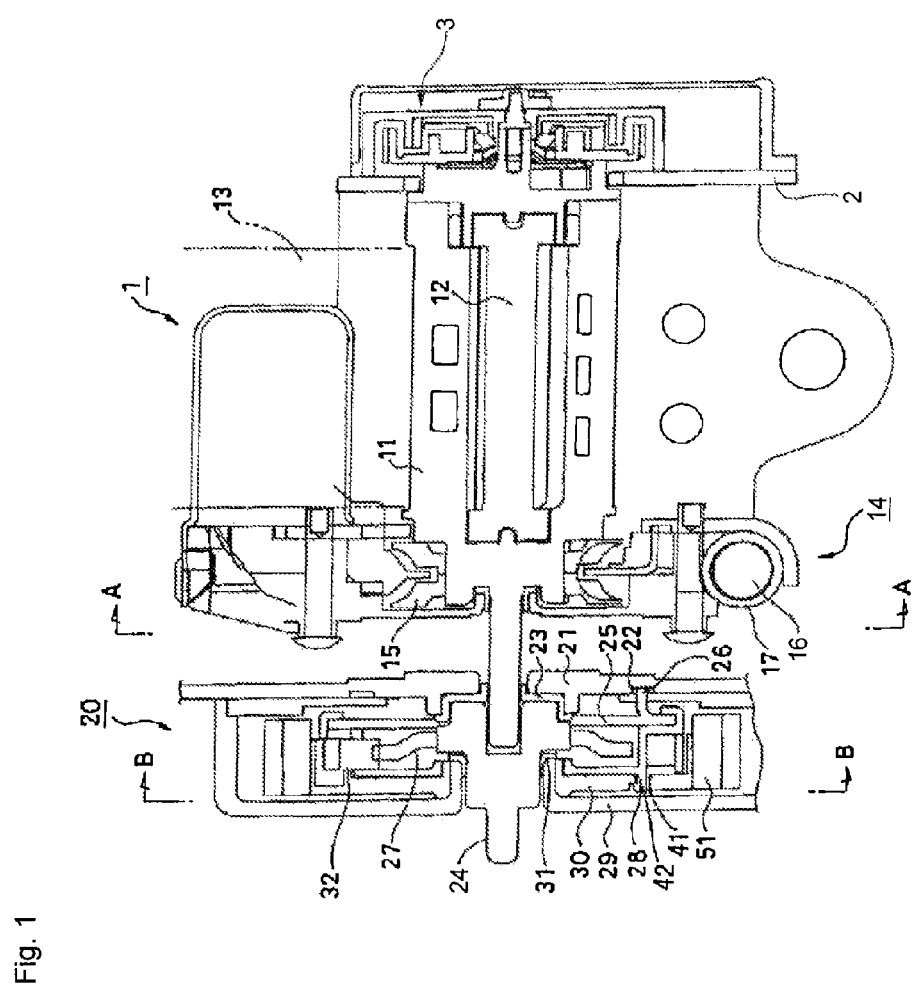
FIG. 1 is a schematic longitudinal sectional view illustrating the vehicle occupant restraint system according to the first embodiment of the present invention.
Figure 2:
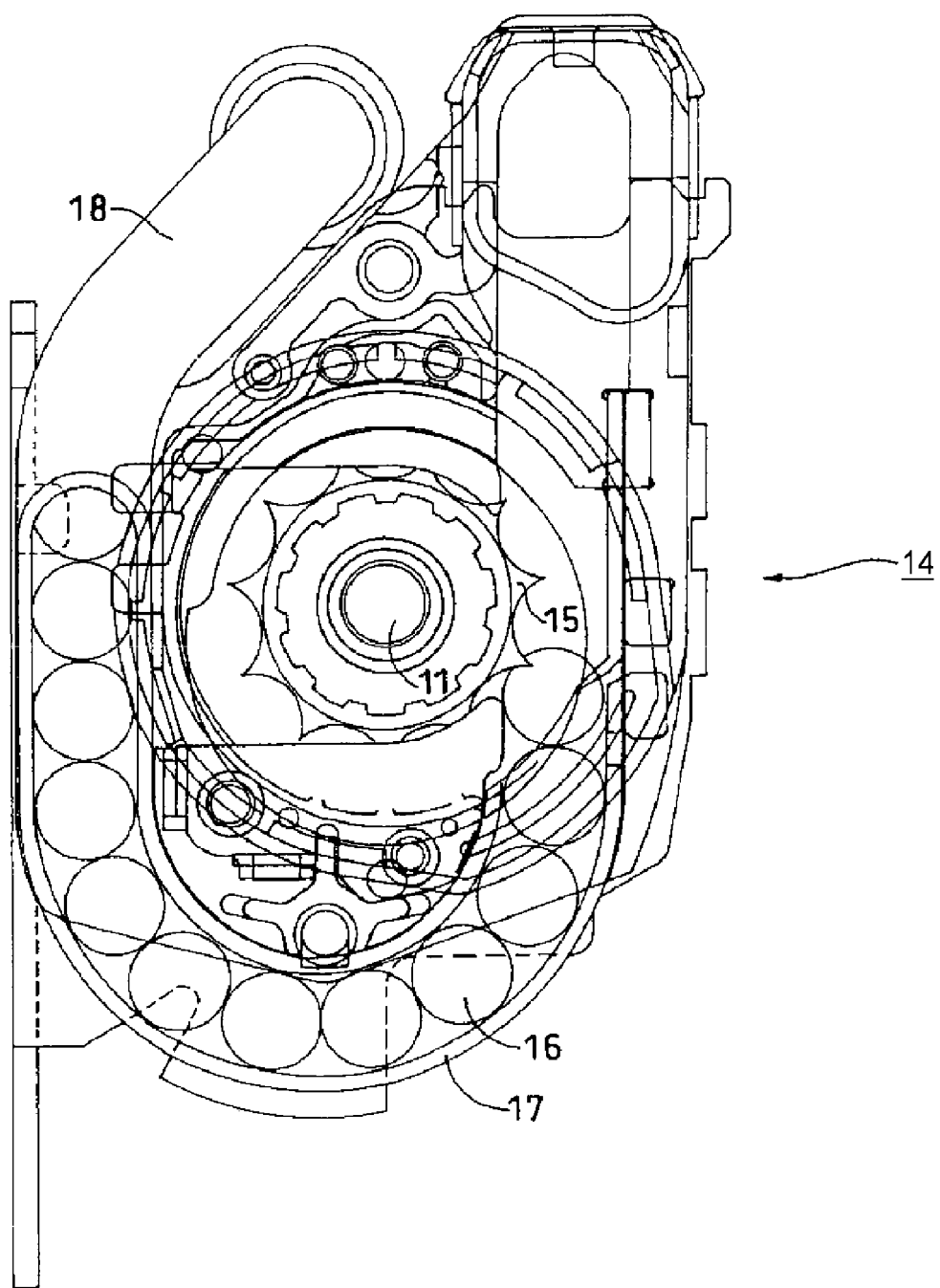
FIG. 2 is a cross-sectional view taken generally along line AA of FIG. 1, with parts broken away for the sake of clarity.
Figure 3:
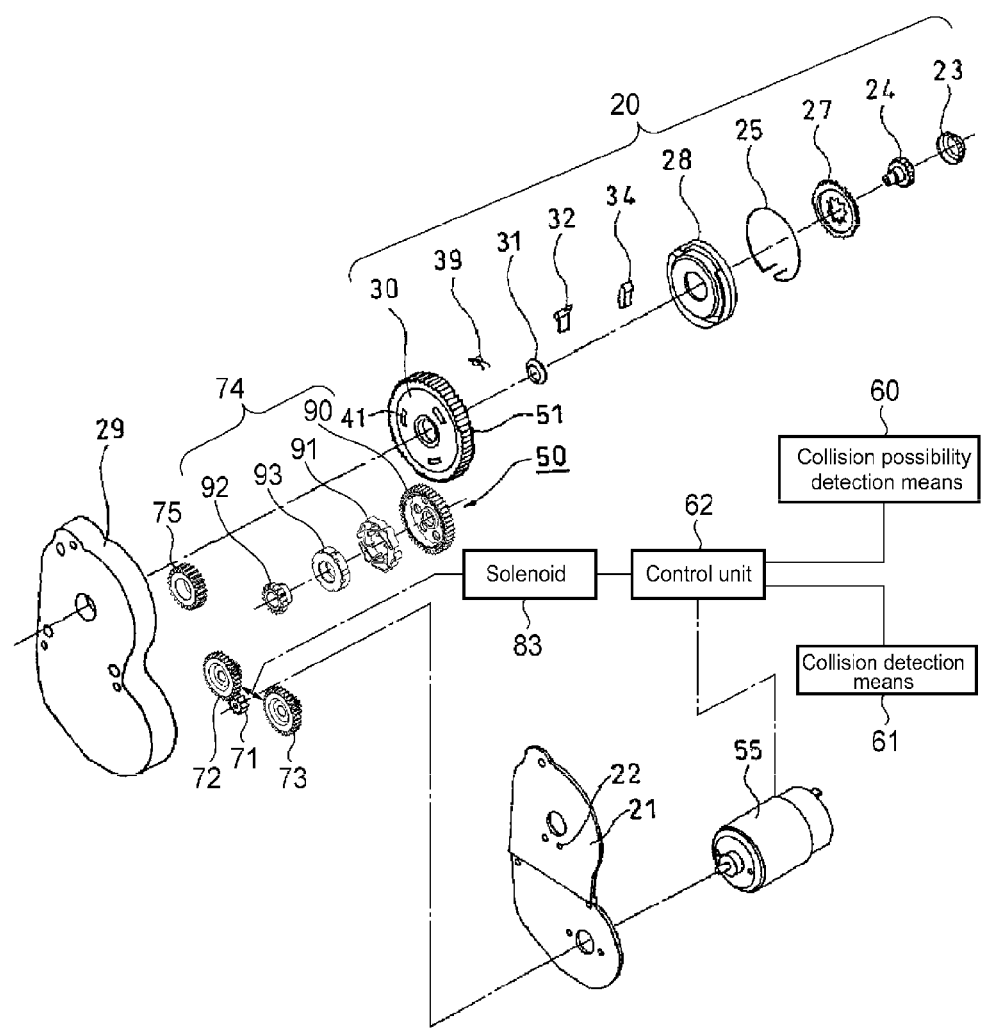
FIG. 3 is an exploded schematic perspective view of the clutch mechanism that transmits motive power from the motor of the vehicle occupant restraint system of the present invention.

As shown in FIG. 1 to FIG. 3, the vehicle occupant restraint system 1 of this embodiment comprises a spindle 11 that winds a seatbelt 13, a cartridge actuator (pretensioner) 14 connected to the spindle 11, a motor 55 as an electric actuator, and a clutch mechanism 20 as a part of the power transmission mechanism that transmits motive power from the motor 55 to the spindle 11. Inside the spindle 11, a torsion bar 12, which operates as an energy absorption mechanism, is provided by being connected to the spindle 11. Moreover, the vehicle occupant restraint system 1 is provided with a locking mechanism 3 that is mounted on a retractor frame 2 and locks the pull-out operation of the seatbelt 13, and a winding spring device 4 (refer to FIG. 12) that biases the spindle 11 in the winding direction of the seatbelt 13.

The pretensioner 14 comprises a pinion 15 connected to the spindle 11, a tube 17 which houses a ball 16, and a gas generator 18 provided to one end of the tube 17. When the powder is ignited, gas is generated by the gas generator 18 and the ball 16 inside the tube 17 is strongly pushed out. The ball 16 that was pushed out moves along a groove of the pinion 15, and causes the spindle 11 to rotate so as to wind the seatbelt 13.

The motor 55 is connected to a power transmission mechanism 50 configured from a gear train, and the rotation of the motor 55 is reduced by the power transmission mechanism 50. The power transmission mechanism 50 and the clutch mechanism 20 are housed in a container configured from a lower cover 21 and an upper cover 29.

Figure 4:
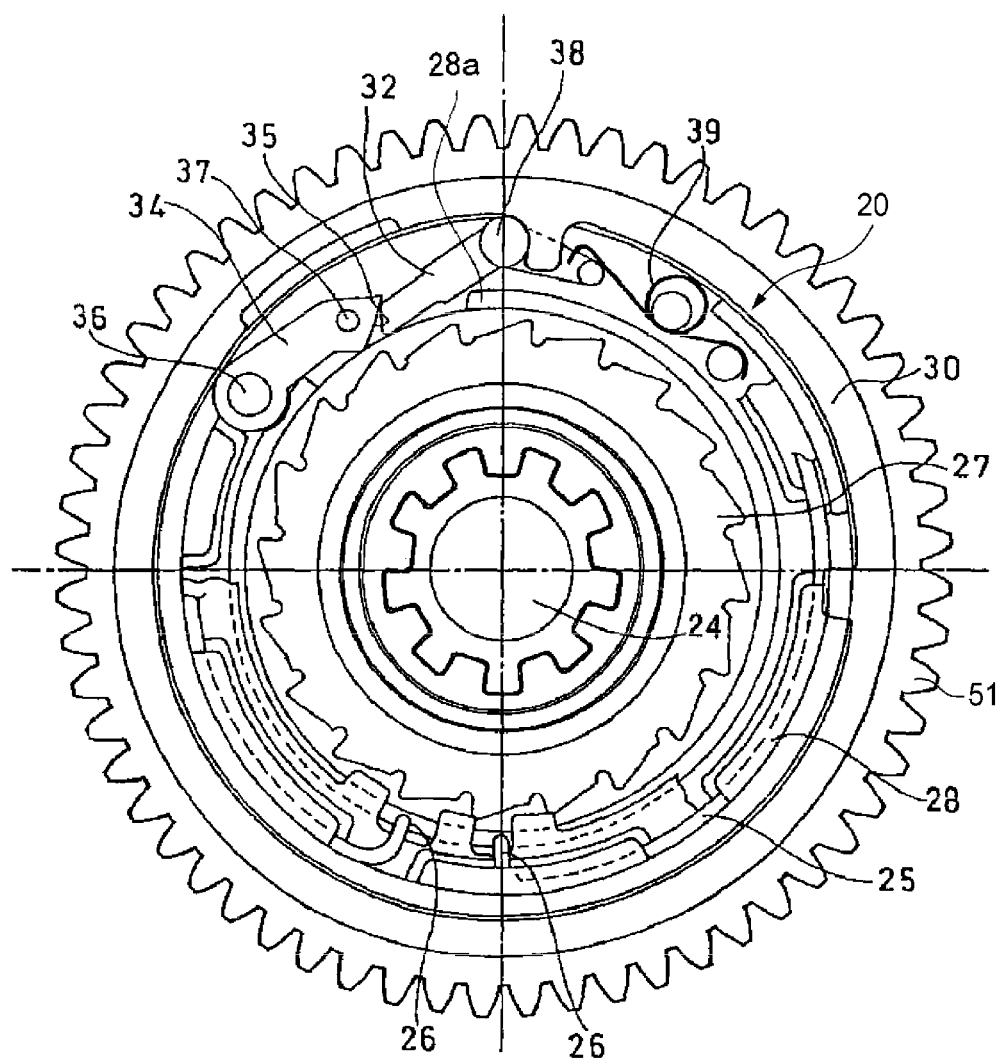
FIG. 4 is a longitudinal sectional view generally taken along line B-B of FIG. 1, and illustrates the actuation of the clutch mechanism that transmits motive power from the motor.

As also shown in FIG. 4, the clutch mechanism 20 comprises a joint 24, a latch plate (ratchet wheel) 27, a final gear 51 of the power transmission mechanism 50, a pole 32, a return spring 39 as a biasing member, a guide ring 30, a clutch wheel 28, a rotor cam 34, a friction spring 25, and bushes 23, 31. The joint 24 is connected to the spindle 11, and the latch plate 27 is integrated with the joint 24 and rotates together with the spindle 11. The final gear 51 is gear-coupled to the rotating shaft of the motor 55. The pole 32 is mounted on the final gear 51 rotatably around the shaft 38, and is engageable with the teeth of the latch plate 27. The return spring 39 biases the pole 32 in a releasing direction from the latch plate 27. The guide ring 30 is provided inside the final gear 51 integrally with the final gear 51, and the clutch wheel 28 comprises three foot parts 42 which are respectively rotatable, in a relative manner, only at a required angle relative to three holes 41 of the guide ring 30. The rotor cam 34 is mounted on the clutch wheel 28 rotatably around the shaft 36 and fixed to and mounted on the clutch wheel 28 with a fixing pin 37, and its rotation is prohibited in a state of being fixed to the clutch wheel 28 by the fixing pin 37, and becomes rotatable based on the disengagement of the fixing pin 37. The friction spring 25 is connected to the clutch wheel 28 via frictional sliding as a result of an end part 26 being inserted into a concave portion 22 of the lower cover 21 and being mounted on the lower cover 21. One end of the pole 32 moves along a cam surface 35 of a rotor cam 34.

Note that a rib 28a is formed on the clutch wheel 28 at a predetermined position across the circumferential direction, and one end part of the rib 28a is positioned near the pole 32 during non-actuation where winding is not performed by the motor 55. In addition, if the pole 32 turns due to a thumping vibration or the like of the vehicle during non-actuation of the motor 55, the rib 28a comes into contact with the pole 32 and prevents the pole 32 from unnecessarily turning in a direction of engaging with the latch plate 27.

Figure 9:
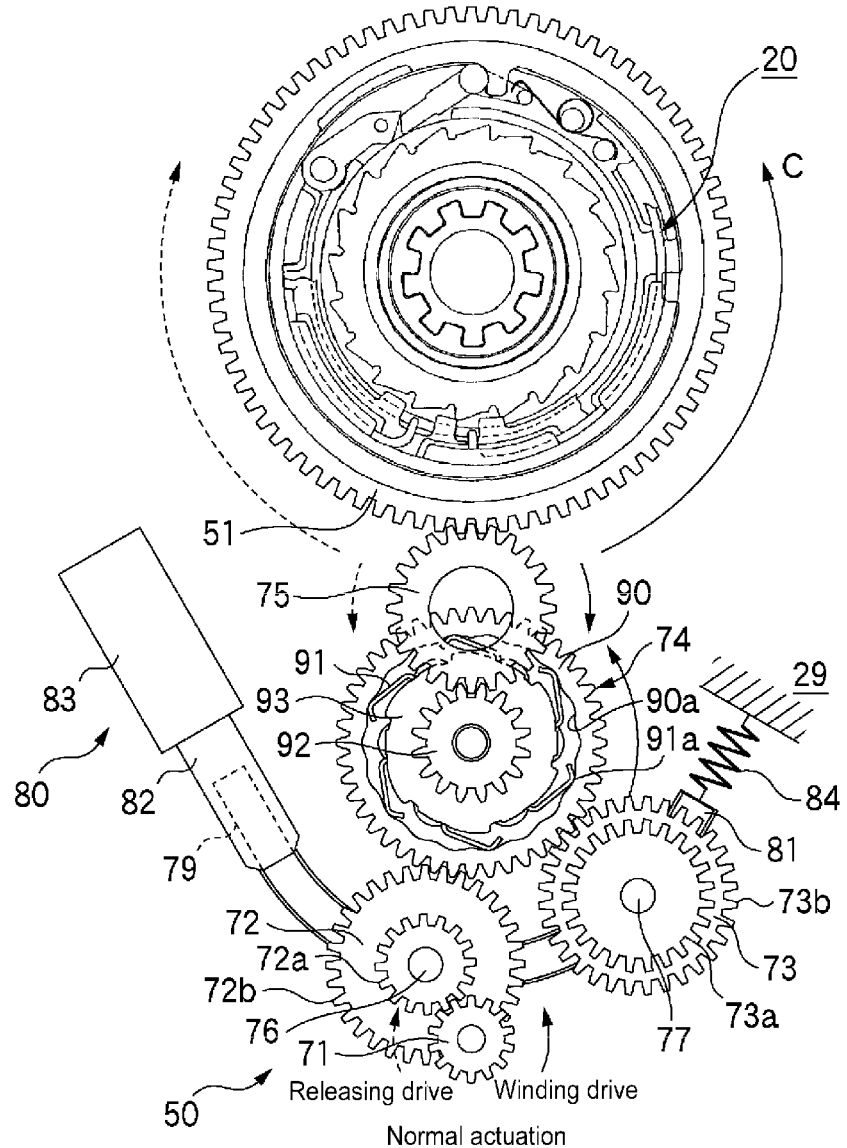
FIG. 9 is a diagram explaining the power transmission mechanism of the present invention.

As shown in FIG. 9, the power transmission mechanism 50 of this embodiment comprises a gear train configured from first to fifth gears 71, 72, 73, 74, 75, and switching means 80, and the fifth gear 75 is meshed with the final gear 51. The first gear (electric actuator-side gear) 71 is fixed to a motor shaft of the motor 55, and the second gear (first reduction gear) 72 includes a pinion 72a capable of meshing with the first gear 71 and a wheel 72b which meshes with the fourth gear 74. Moreover, the third gear (second reduction gear) 73 comprises another pinion 73a capable of meshing with the first gear 71 and another wheel 73b which meshes with the fourth gear 74. The pitch circle diameter of the wheel 72b of the second gear 72 and the pitch circle diameter of the other wheel 73b of the third gear 73 are of the same pitch circle diameter. Moreover, the pitch circle diameter of the pinion 72a of the second gear 72 is smaller than the pitch circle diameter of the other pinion 73a of the third gear 73.

Central shafts 76, 77 which rotatably support the second gear 72 and the third gear 73, respectively, are rotatably guided to a moving member 81, and are slidably fitted into the circular groove 79 provided to the upper cover 29. The circular groove 79 is formed on a circle with the rotational center of the fourth gear 74 as the center thereof with the sum of the pitch circle radius of the fourth gear 74 and the pitch circle radius of the wheel 72b of the second gear 72 (other wheel 73b of the third gear 73) as the radius. Consequently, the second gear 72 and the third gear 73 are guided to the circular groove 79 in a state where the respective wheels 72b, 73b are meshed with the fourth gear 74, and are thereby able to oscillate the outer peripheral side of the fourth gear 74.

The switching means 80 is used for selectively switching the gear wheel of the other side, which meshes with the first gear 71, to the pinion 72a of the second gear 72, or the other pinion 73a of the third gear 73. The switching means 80 includes an electromagnetic solenoid 83 in which a plunger 82 is coupled to one end part of the moving member 81, and an extension spring 84 which biases the other end part of the moving member 81 in a direction which becomes separated from the electromagnetic solenoid 83. Note that the switching means 80 is not limited to the configuration of comprising the moving member 81 which oscillates in the circular groove 79, and will suffice so as long as it can selectively switch between the second gear 72 and the third gear 73 while rotatably supporting the central shafts 76, 77. For example, as a result of causing the pitch circle diameters of the pinions 72a, 73a of the second gear 72 and the third gear 73 to be equal and changing the pitch circle diameters of the wheels 72b, 73b, it is possible to move the central shafts 76, 77 of the second gear 72 and the third gear 73 around the rotational center of the first gear 71, thereby selectively causing one of the wheels 72b, 73b to mesh with the fourth gear wheel 74.

Figure 10:
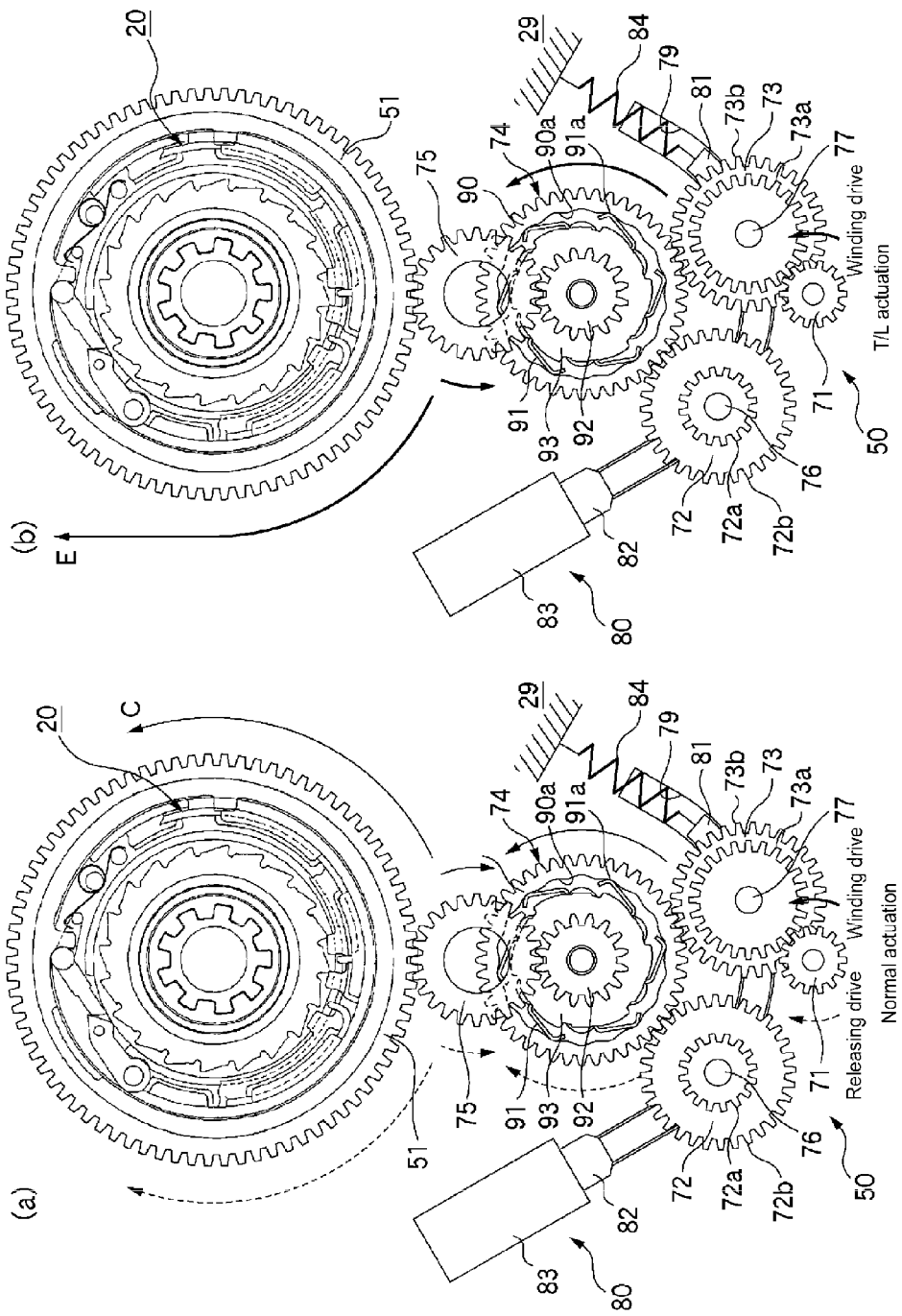
FIG. 10(a) and FIG. 10(b) are diagrams illustrating the power transmission mechanism of the present invention.

As shown in FIG. 9, when the electromagnetic solenoid 83 is not actuated, the plunger 82 will protrude due to the biasing force of the extension spring 84, and the first gear 71 and the pinion 72a of the second gear 72 become meshed. Meanwhile, as shown in FIG. 10(a), when the electromagnetic solenoid 83 is actuated, the plunger 82 is pulled back, and the first gear 71 and the pinion 73a of the third gear 73 become meshed.

Since the pitch circle diameter of the pinion 72a of the second gear 72 is smaller than the pitch circle diameter of the pinion 73a of the third gear 73, the transmission path of the first gear 71, the pinion 72a of the second gear 72, the wheel 72b, and the fourth gear 74 will be the low reduction transmission path (first reduction transmission path) with a small reduction ratio, and the transmission path of the first gear 71, the pinion 73a of the third gear 73, the wheel 73b, and the fourth gear 74 will be the high reduction transmission path (second reduction transmission path) with a large reduction ratio. In other words, the switching means 80 switches the transmission path of the power transmission mechanism 50 to the low reduction transmission path or the high reduction transmission path.

The fourth gear 74 is a gear assembly with a torque limit mechanism comprising a bottomed cylindrical large diameter-side gear 90, a plurality of limit springs 91, a cylindrical small diameter-side gear 92, and a spring holder 93, and the large diameter-side gear 90 meshes with the second gear 72 and the third gear 73, and the small diameter-side gear 92 meshes with the fifth gear 75.

The inner wall of the large diameter-side gear 90 includes a locking surface 90a, which is a plurality of concave portions formed at predetermined intervals in the circumferential direction, and the protrusion 91a provided to the tip of the limit spring 91 locks with the locking surface 90a. The torque limit mechanism absorbs the torque as a result of the protrusion 91a of the limit spring 91 passing over the convex portion upon moving from the locking surface 90a of the large diameter-side gear 90 to the adjacent locking surface 90a when the large diameter-side gear 90 and the small diameter-side gear 92 engage in relative rotation.

The actuation of the vehicle occupant restraint system 1 is now explained in detail with reference to FIG. 4 to FIG. 12. During ordinary driving where the occupant is wearing a seatbelt and the vehicle is traveling, if winding by the motor 55 is not being performed, as shown in FIG. 4, the latch plate 27 and the pole 32 of the clutch mechanism 20 are disengaged, the latch plate 27 that is integral with the spindle 11 can rotate freely, and the normal winding/pulling of the seatbelt 13 is enabled. Moreover, as shown in FIG. 9, the electromagnetic solenoid 83 is in a non-actuated state, and the low reduction transmission path with a small reduction ratio where the first gear 71 meshes with the pinion 72a of the second gear 72 and the wheel 72b of the second gear 72 meshes with the fourth gear 74 is configured.

Figure 5:
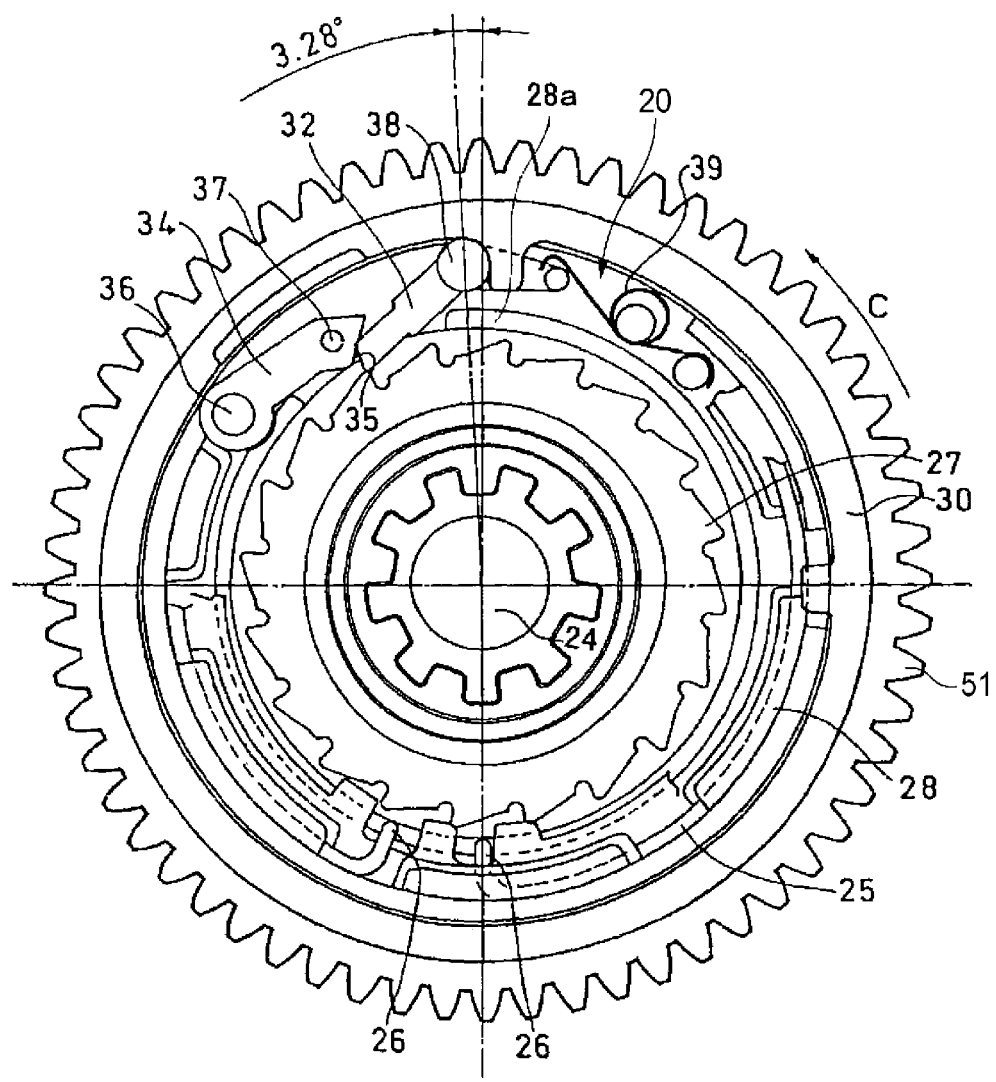
FIG. 5 is a longitudinal sectional view generally taken along line B-B of FIG. 1, and illustrates the actuation of the clutch mechanism that transmits motive power from the motor.
Figure 11:
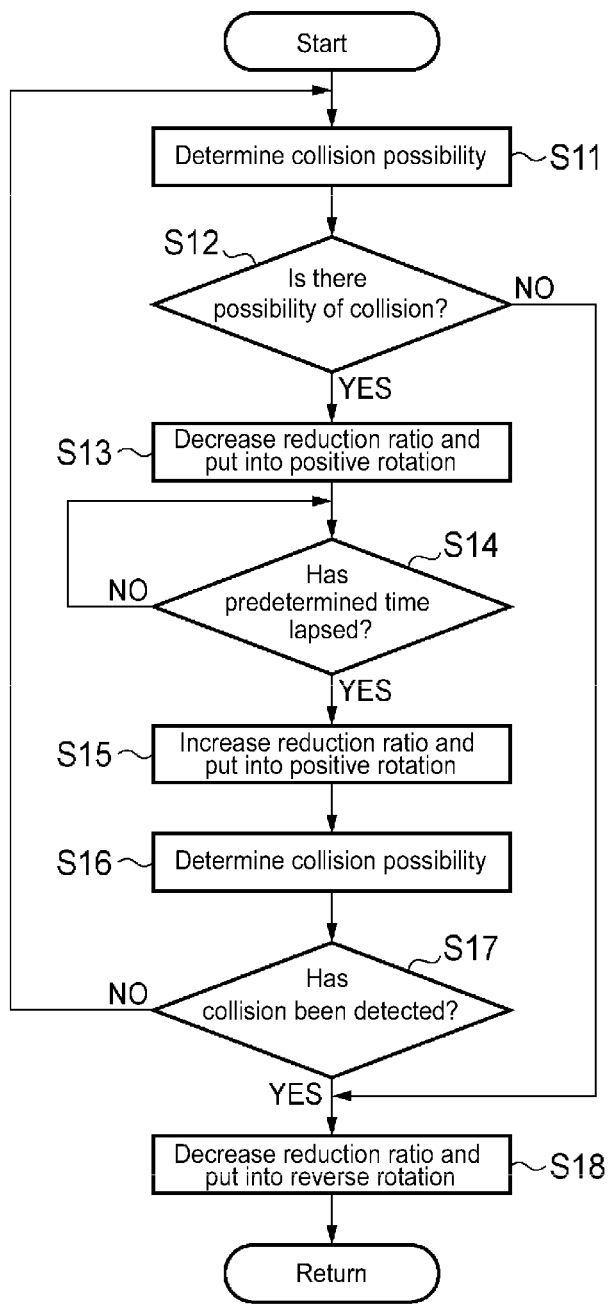
FIG. 11 is a flowchart showing the actuation process of the vehicle occupant restraint system when there is a possibility of collision.

Here, as shown in FIG. 11, collision possibility detection means 60 (refer to FIG. 3) determines the possibility of collision (step S11). In addition, when it is determined that there is a possibility of collision (step S12), the control unit 62 rotates the motor 55 to the winding side (hereinafter also referred to as the "positive rotation") (step S13). When the motor 55 is positively rotated, as shown in FIG. 9, the final gear 51 that is gear-coupled to the rotating shaft of the motor 55 via the low reduction transmission path rotates in the counterclockwise direction (C direction). Moreover, as shown in FIG. 5, with the clutch mechanism 20, the pole 32 that is rotatably mounted on the final gear 51 rotates to the side of the latch plate 27 along the cam surface 35 of the rotor cam 34 against the biasing force of the return spring 39, and starts engaging with the latch plate 27.

Figure 6:
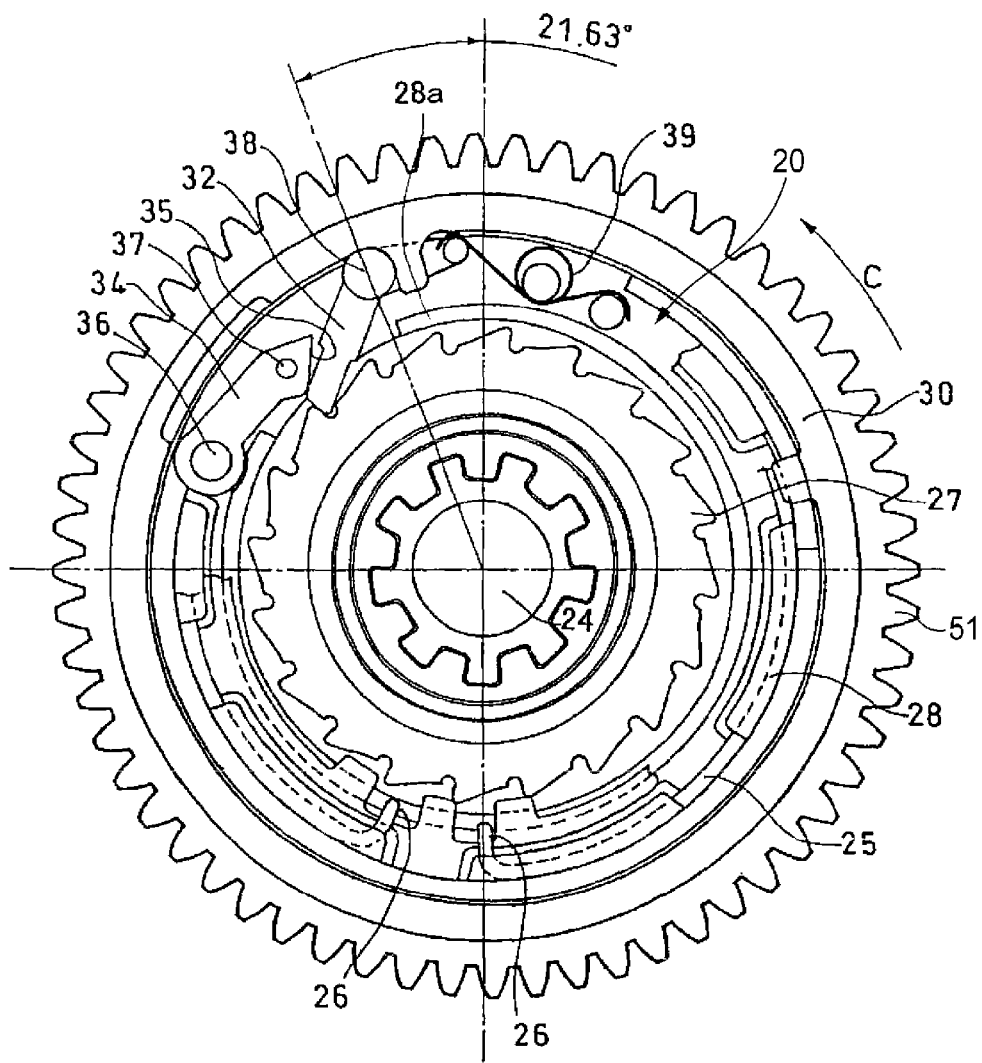
FIG. 6 is a longitudinal sectional view generally taken along line B-B of FIG. 1, and illustrates the actuation of the clutch mechanism that transmits motive power from the motor.

As shown in FIG. 6, when the pole 32 engages with the latch plate 27, the rotation of the final gear 51 is transmitted to the spindle 11 via the latch plate 27, and the winding of the seatbelt 13 is started at a high speed and low torque. Here, the rotor cam 34, together with the clutch wheel 28, frictionally slides and rotates relative to the friction spring 25.

The control unit 62 determines whether a predetermined time has lapsed from the start of supplying a drive current to the motor 55 (step S14). If a predetermined time has lapsed, as shown in FIG. 10(a), the control unit 62 actuates the electromagnetic solenoid 83 to pull in the plunger 82, and the first gear 71 and the pinion 73a of the third gear 73 become meshed. In other words, the transmission path of the power transmission mechanism 50 is switched to the high reduction transmission path in which the first gear 71 and the pinion 73a of the third gear 73 become meshed, and the wheel 73b of the third gear 73 and the fourth gear 74 become meshed. Consequently, the rotation of the motor 55 is reduced at a high reduction ratio and transmitted to the fifth gear 75, the seatbelt 13 is wound at a low speed and high torque, and the occupant is thereby lightly restrained (step S15).

Note that the predetermined time of step S14 is set to a time that is at least required for the switching of the clutch mechanism 20 to be completed. The required torque is small since the respective members are not coupled with the spindle 11 until the switching of the clutch mechanism 20 is complete, the switching operation of the clutch can be performed at a high speed and low torque via the low reduction transmission path, and it is thereby possible to shorten the time from when the rotation of the motor 55 is started to when the switching of the clutch mechanism 20 is complete.

As the collision possibility detection means 60, various means such as a brake, a radar or the like may be used. For example, when determining the collision possibility based on a brake operation, the actuation of the vehicle occupant restraint system 1 is started when the brake pedal is subject to a sudden brake operation. When the vehicle consequently decelerates rapidly, the occupant will be thrown forward, but the seatbelt 13 can be wound therebefore, and the occupant can be protected as a result of restricting his/her movement. Moreover, when linking this with a radar, the vehicle occupant restraint system 1 may be actuated only when the control unit 62 detects the possibility of a collision at the last moment and determines that the collision is unavoidable.

Note that, with both the low reduction transmission path and the high reduction transmission path, during the winding based on the drive of the motor 55 under normal conditions, as shown in FIG. 10(a), the large diameter-side gear 90 and the small diameter-side gear 92 of the fourth gear 74 are rotated in the same direction in the winding direction shown with a solid line or in the releasing direction shown with a dotted line in the diagram since the relative phase is retained by the limit spring 91 in an assembled state.

Here, when a torque difference that is greater than a predetermined torque is generated between the large diameter-side gear 90 and the small diameter-side gear 92 due to a minor collision or braking, which will not cause the pretensionser 14 to actuate, during the winding by the drive of the motor 55, the protrusion 91a of the limit spring 91 is released from its locking with the locking surface 90a, and will start to slide along the inner while being subject to elastic deformation. Thus, by the protrusion 91a locking with the adjacent locking surface 90a, rotation slippage will arise between the large diameter-side gear 90 and the small diameter-side gear 92, and, as shown in FIG. 10(b), the fifth gear 75 and the final gear 51 will rotate in the belt-pulling direction (arrow E direction). Consequently, it is possible to inhibit excessive torque from being transmitted by the motor 55, prevent damage to the gear teeth, and reduce the influence on the restraining performance during the energy absorption operation.

Subsequently, the collision or non-collision is determined by collision detection means 61 (refer to FIG. 3) (step S16). When a collision is detected (step S17), the transmission path of the power transmission mechanism 50 is switched from the high reduction transmission path to the low reduction transmission path (refer to FIG. 10(a)), and the motor 55 is rotated to the clutch-releasing side (hereinafter also referred to as the "reverse rotation") (step S18).

Figure 7:
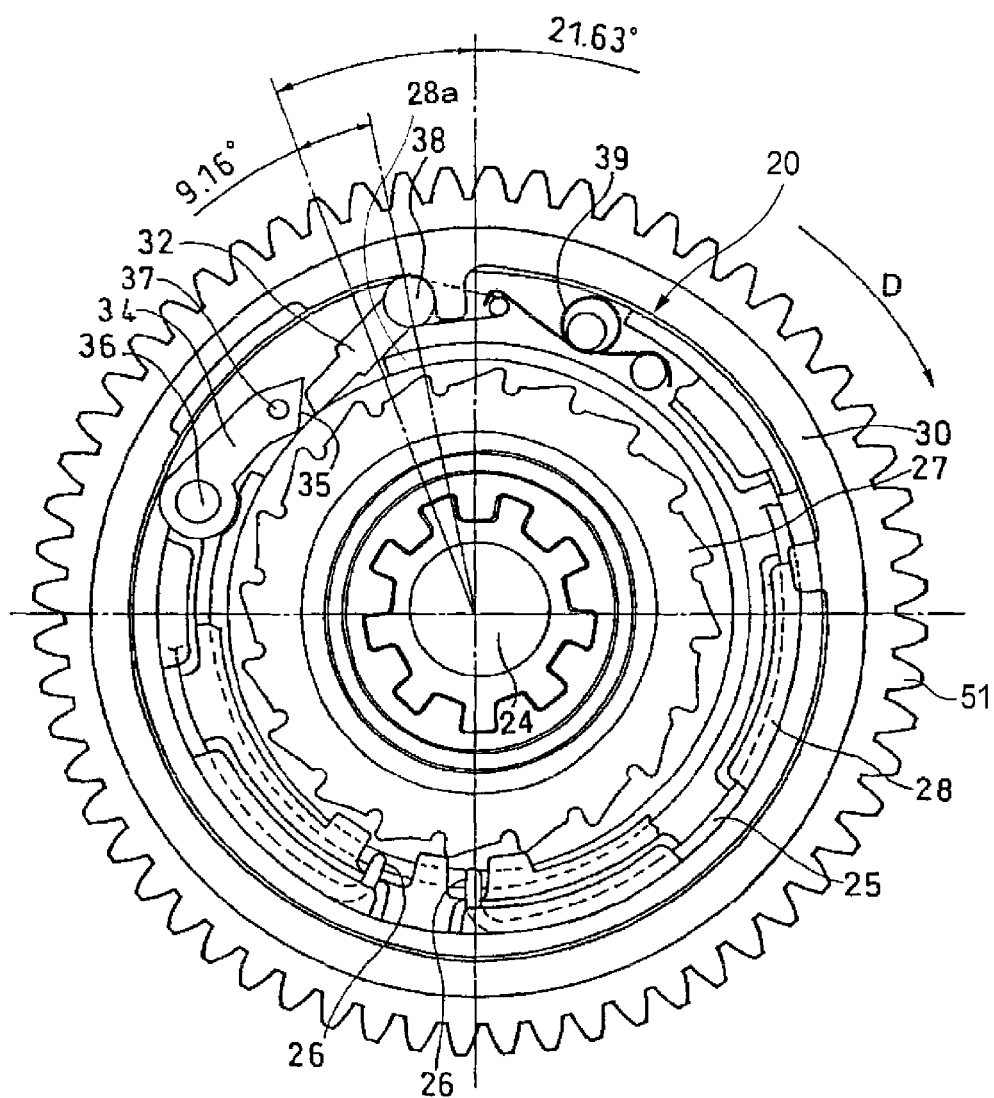
FIG. 7 is a longitudinal sectional view generally taken along line B-B of FIG. 1, and illustrates the actuation of the clutch mechanism that transmits motive power from the motor.

As shown in FIG. 7, when the motor 55 is rotated to the releasing side (clockwise direction), the final gear 51 rotates in the releasing direction (clockwise direction: D direction) according to the rotation. The pole 32 will rotate together with the final gear 51, but the clutch wheel 28 and the rotor cam 34 mounted thereon will remain due to the friction spring 25. The pole 32 becomes separated from the latch plate 27 along the cam surface 35 of the rotor cam 34 based on the biasing force of the return spring 39, and the pole 32 becomes disengaged from the latch plate 27. Consequently, since the coupling of the power transmission mechanism 50 and the spindle 11 will be disconnected, it is possible to prevent the influence of the power transmission mechanism 50 on the occupant protection mechanism (spindle side) when the pretensioner 14 is actuated.

Figure 8:
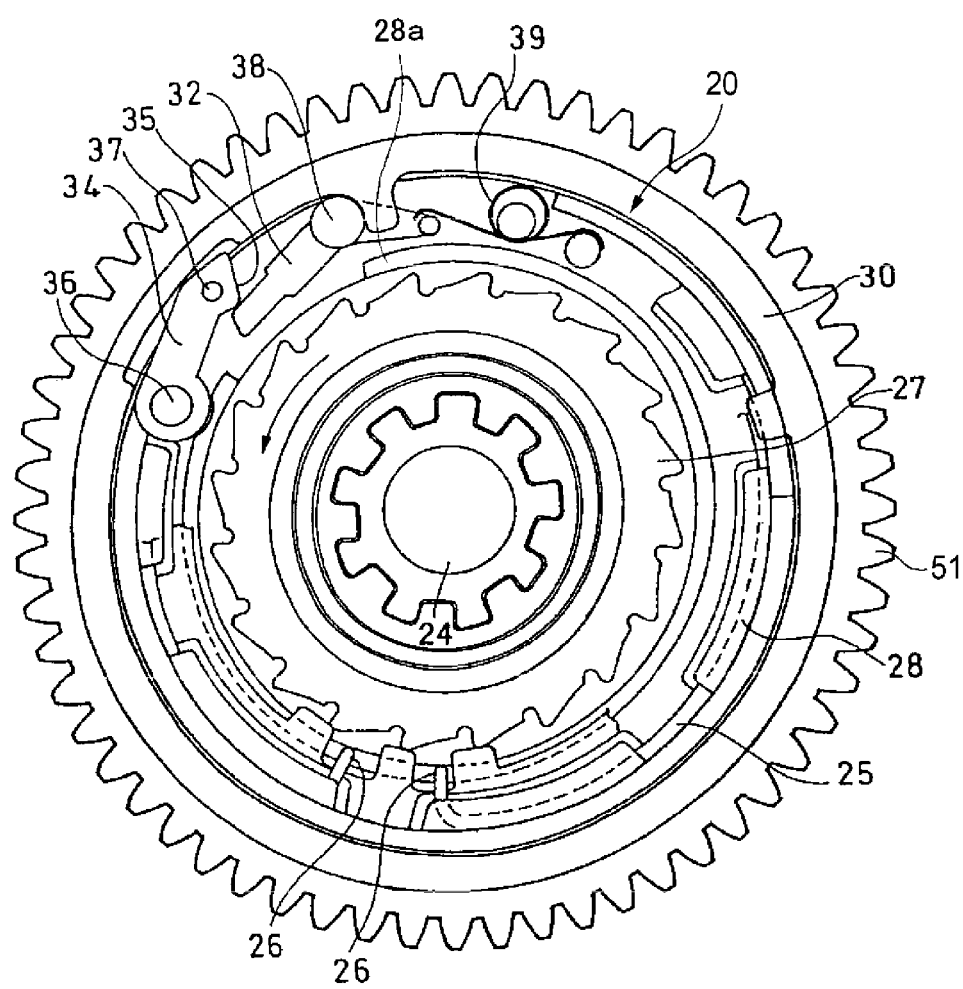
FIG. 8 is a longitudinal sectional view generally taken along line B-B of FIG. 1, and illustrates the actuation of the clutch mechanism that transmits motive power from the motor.

In addition, as shown in FIG. 8, when a collision occurs, the seatbelt 13 is wound by the cartridge actuator (pretensioner) 14 at a speed that is greater than the winding speed by the motor 55 before the collision, and, when force greater than a predetermined tensile force is applied to the seatbelt 13, the tensile force is limited by the torsion bar 12. When the pretensioner 14 is actuated, the pole 32 is flicked outward by the tooth surface of the latch plate 27 due to the high-speed winding rotation of the spindle 11 and the latch plate 27 that is integral therewith. Simultaneously, the rotor cam 34 is pushed by the pole 32 and rotates outward around the shaft 36 of the clutch wheel 28. Due to this rotational force, the fixing pin 37 of the clutch wheel 28 is subject to shear. Consequently, the pole 32 and the rotor cam 34 are retained at the outer peripheral part by the biasing force of the return spring 39, and the motive power of the motor 55 will not be transmitted to the spindle 11 by the clutch mechanism 20 thereafter.

When a collision is not detected in step S17, the routine returns to the step before step S11, and once again determines the possibility of a collision. In addition, when it is determined that there is no possibility of a collision in step S12, the transmission path of the power transmission mechanism 50 is switched to the low reduction transmission path, the motor 55 is reversely rotated, and the coupling of the power transmission mechanism 50 and the spindle 11 is quickly released (step S18) so as to eliminate any uncomfortable feeling of the occupant during normal driving.

MODIFIED EXAMPLES

Figure 12:
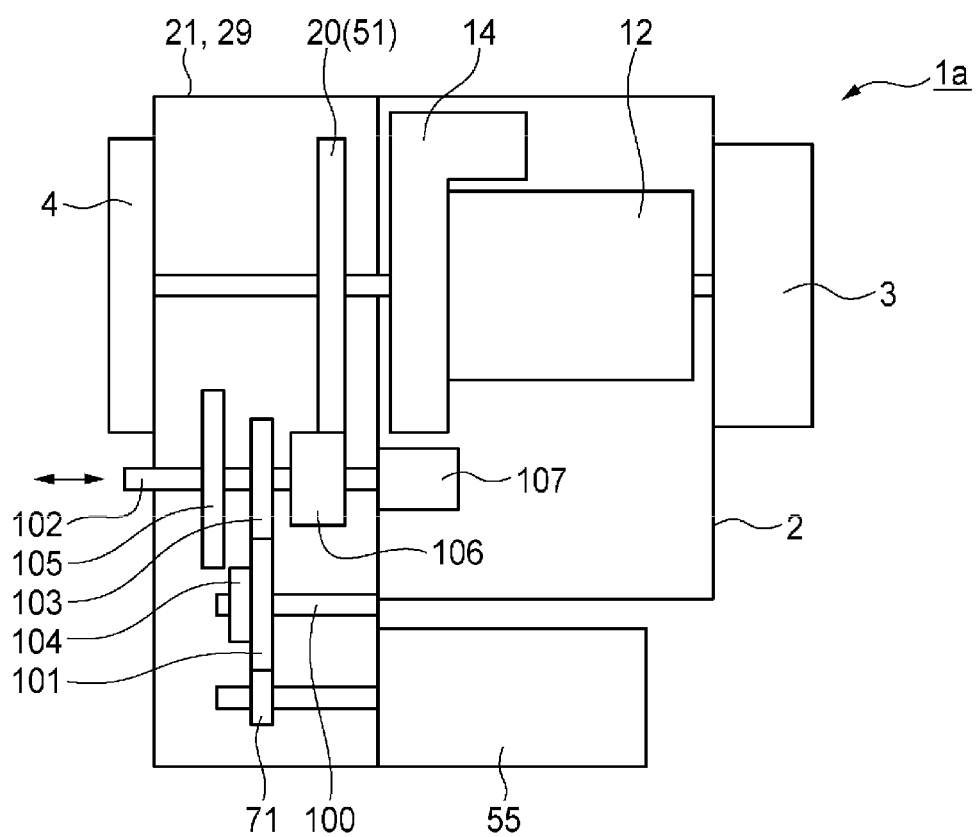
FIG. 12 is a schematic diagram showing the vehicle occupant restraint system according to a modified example of the present invention.

FIG. 12 is a schematic diagram showing a vehicle occupant restraint system 1a according to a modified example of the present invention. Note that this modified example differs from the foregoing embodiments in the configuration of the first reduction transmission path, the second reduction transmission path, and the switching means of the power transmission mechanism 50. Thus, the same reference numeral is given to the same or equivalent members as those of the foregoing embodiments, and the explanation thereof is omitted.

In this modified example, the low reduction transmission path (first reduction transmission path) with a small reduction ratio comprises a high speed fixed gear 101 which is supported by a first shaft 100 that is rotatably mounted on a lower cover 21 and capable of meshing with an electric actuator-side gear 71, and a high speed moving gear 103 which is supported by a second shaft 102 that is mounted movably and rotatably in the axial direction relative to the upper and lower covers 21, 29 and capable of meshing with high speed fixed gear 101. Moreover, the high reduction transmission path (second reduction transmission path) with a large reduction ratio comprises a low speed fixed gear 104 of a diameter that is smaller than the high speed fixed gear 101 which is supported by the first shaft 100, and a low speed moving gear 105 which is provided to the second shaft 102 and capable of meshing with the low speed fixed gear 104.

Moreover, the switching means 80 comprises, in addition to the high speed moving gear 103 and the low speed moving gear 105, a second shaft 102 provided with an output gear 106, and a solenoid 107 which drives the second shaft 102 in the axial direction relative to the upper and lower covers 21, 29. The width of the output gear (clutch mechanism-side gear) 106 is set so that it will constantly mesh with the final gear 51 even when the high speed moving gear 103 and the low speed moving gear 105 are switched. Note that, in this modified example, although the output gear 106 to mesh with the final gear 51 is disposed on the second shaft 102, as with the foregoing embodiments, it is also possible to provide the gear with torque limit mechanism on the second shaft 102, and cause such gear with torque limit mechanism to mesh with the output gear 106 provided to another shaft. Moreover, while the electric actuator-side gear 71 is constantly meshed with the high speed fixed gear 101, it may also be configured so that it is constantly meshed with the low speed fixed gear 104.

Accordingly, even with the vehicle occupant restraint system 1a configured as described above, the same control as the foregoing embodiments can be performed. In other words, when a possibility of collision is detected by the collision possibility detection means 60, the motor 55 is positively rotated, the high speed fixed gear 101 and the high speed moving gear 103 are meshed until the coupling of the clutch mechanism 20 is complete, and the rotation of the motor 55 is transmitted to the clutch mechanism 20 at a high speed and low torque via the first reduction transmission path. Moreover, after the coupling of the clutch mechanism 20 is complete, the second shaft 102 is driven, the power transmission mechanism from the first reduction transmission path to the second reduction transmission path to mesh the low speed fixed gear 104 and the low speed moving gear 105, and the rotation of the motor 55 is transmitted to the clutch mechanism 20 at a low speed and high torque. Moreover, as with the foregoing embodiments, when there is no longer the possibility of collision after actuating the motor 55, or when collision is detected, the motor 55 is reversely rotated, and the rotation of the motor 55 is transmitted to the clutch mechanism 20 at a high speed and low torque via the first reduction transmission path.

Note that the present invention is not limited to the foregoing embodiments, and may be variously modified or improved arbitrarily within a scope that does not deviate from the technical concept that is indicated in the claims. Further note that the present invention is based on a Japanese Patent Application (Japanese Patent No. 2009-232398) filed on Oct. 6, 2009, in which the subject matter thereof is incorporated herein by reference.

The invention claimed is:

1. A vehicle occupant restraint system comprising a spindle that winds a seatbelt, an electric actuator that generates motive power for rotating the spindle, a clutch mechanism that connects or disconnects the electric actuator and the spindle, a power transmission mechanism that can transmit motive power from the electric actuator to the clutch mechanism, and collision possibility detector configured to detect information for determining a possibility of collision, and a controller coupled to the electric actuator,
wherein the power transmission mechanism further comprises:
a first reduction transmission path that reduces the rotation of the electric actuator at a first reduction ratio and transmits the rotation to the clutch mechanism;
a second reduction transmission path that reduces the rotation of the electric actuator at a reduction ratio that is higher than the first reduction ratio and transmits the rotation to the clutch mechanism; and
switching mechanism configured to switch the connection with the clutch mechanism between the first reduction transmission path and the second reduction transmission path,
whereby when a possibility of collision is detected by the collision possibility detector, the controller is configured to supply a driving current to the electric actuator causing winding of the electric actuator in a winding direction, and the rotation of the electric actuator is transmitted to the clutch mechanism at a high speed and low torque via the first reduction transmission path until the coupling of the clutch mechanism is complete and a predetermined time has passed after starting to supply the driving current to the electric motor, and
after the coupling of the clutch mechanism is complete and the spindle starts winding the seat belt, the controller is configured to cause the power transmission mechanism to be switched from the first reduction transmission path to the second reduction transmission path, whereby the rotation of the electric actuator is transmitted to the clutch mechanism at a low speed and high torque.

2. The vehicle occupant restraint system according to claim 1,
wherein, when there is no longer the possibility of collision after the electric actuator is actuated, the controller is configured to cause the electric actuator to be rotated in a direction to release the clutch, and the rotation of the electric actuator is transmitted to the clutch mechanism at a high speed and low torque via the first reduction transmission path.

3. The vehicle occupant restraint system according to claim 1, further comprising:
  collision detector configured to detect a collision of a vehicle,
  wherein, when the collision is detected by the collision detector after the electric actuator is actuated, the controller is configured to cause the electric actuator to be rotated in a direction to release the clutch, and the rotation of the electric actuator is transmitted to the clutch mechanism at a high speed and low torque via the first reduction transmission path, and the coupling of the power transmission mechanism and the spindle is disconnected.

4. A vehicle occupant restraint system comprising a spindle that winds a seatbelt, an electric actuator that generates motive power for rotating the spindle, a clutch mechanism that connects or disconnects the electric actuator and the spindle, a power transmission mechanism that can transmit motive power from the electric actuator to the clutch mechanism, and collision possibility detector configured to detect information for determining a possibility of collision,
  wherein the power transmission mechanism further comprises:
  a first reduction transmission path that reduces the rotation of the electric actuator at a first reduction ratio and transmits the rotation to the clutch mechanism;
  a second reduction transmission path that reduces the rotation of the electric actuator at a reduction ratio that is higher than the first reduction ratio and transmits the rotation to the clutch mechanism; and
  switching mechanism configured to switch the connection with the clutch mechanism between the first reduction transmission path and the second reduction transmission path,
  whereby when a possibility of collision is detected by the collision possibility detector, the collision possibility detector is configured to cause the electric actuator to be positively rotated, and the rotation of the electric actuator is transmitted to the clutch mechanism at a high speed and low torque via the first reduction transmission path at least until the coupling of the clutch mechanism is complete, and
  after the coupling of the clutch mechanism is complete the power transmission mechanism is configured to be switched from the first reduction transmission path to the second reduction transmission path, and whereby the rotation of the electric actuator is transmitted to the clutch mechanism at a low speed and high torque,
  wherein the first reduction transmission path is provided with an electric actuator-side gear, a clutch mechanism-side gear, and a first reduction gear including a pinion configured to mesh with the electric actuator-side gear, and a wheel configured to mesh with the clutch mechanism-side gear,
  the second reduction transmission path is provided with the electric actuator-side gear, the clutch mechanism-side gear, and a second reduction gear including another pinion configured to mesh with the electric actuator-side gear, and another wheel configured to mesh with the clutch mechanism-side gear, and
  the switching mechanism is configured to switch a position of the first reduction gear and a position of the second reduction gear so that the pinion and the wheel of the first reduction gear or the other pinion and the other wheel of the second reduction gear respectively mesh with the electric actuator-side gear and the clutch mechanism-side gear.

5. A vehicle occupant restraint system comprising a spindle that winds a seatbelt, an electric actuator that generates motive power for rotating the spindle, a clutch mechanism that connects or disconnects the electric actuator and the spindle, a power transmission mechanism that can transmit motive power from the electric actuator to the clutch mechanism, and collision possibility detector configured to detect information for determining a possibility of collision,
  wherein the power transmission mechanism further comprises:
  a first reduction transmission path that reduces the rotation of the electric actuator at a first reduction ratio and transmits the rotation to the clutch mechanism;
  a second reduction transmission path that reduces the rotation of the electric actuator at a reduction ratio that is higher than the first reduction ratio and transmits the rotation to the clutch mechanism; and
  switching mechanism configured to switch the connection with the clutch mechanism between the first reduction transmission path and the second reduction transmission path,
  whereby when a possibility of collision is detected by the collision possibility detector, the collision possibility detector is configured to cause the electric actuator to be positively rotated, and the rotation of the electric actuator is transmitted to the clutch mechanism at a high speed and low torque via the first reduction transmission path at least until the coupling of the clutch mechanism is complete, and
  after the coupling of the clutch mechanism is complete the power transmission mechanism is configured to be switched from the first reduction transmission path to the second reduction transmission path, and whereby the rotation of the electric actuator is transmitted to the clutch mechanism at a low speed and high torque,
  wherein the first reduction transmission path is provided with an electric actuator-side gear, a high speed fixed gear that is supported by a first shaft and configured to mesh with the electric actuator-side gear, a high speed moving gear that is supported by a second shaft that is movable in an axial direction and that is configured to mesh with the high speed fixed gear, and a clutch mechanism-side gear that is supported by the second shaft,
  the second reduction transmission path is provided with the electric actuator-side gear, a low speed fixed gear that is supported by the first shaft, a low speed moving gear that is provided to the second shaft and configured to mesh with the low speed fixed gear, and the clutch mechanism-side gear, and
  the switching mechanism being configured to move the second shaft in the axial direction so that the high speed fixed gear meshes with the high speed moving gear, or the low speed fixed gear meshes with the low speed moving gear.

* * * * *